United States Patent [19]

Berloty

[11] 4,109,436
[45] Aug. 29, 1978

[54] REINFORCED FOAM BUILDING PANEL ELEMENT

[76] Inventor: Adrien Berloty, 15, Boulevard du Château, 92200 Neuilly S. Seine, France

[21] Appl. No.: 630,606

[22] Filed: Nov. 10, 1975

[30] Foreign Application Priority Data

Nov. 27, 1974 [FR] France .................. 74 38828

[51] Int. Cl.² .................................................. E04C 2/22
[52] U.S. Cl. ................... 52/309.2; 52/309.8; 52/364
[58] Field of Search ............. 52/371, 612, 600, 602, 52/309.2, 309.7, 364, 367, 373, 376, 309.8, 309.11

[56] References Cited

U.S. PATENT DOCUMENTS

| 640,526 | 1/1900 | Bell ........................................ 52/371 |
| 680,445 | 8/1901 | Stone ..................................... 52/376 |
| 1,075,910 | 10/1913 | Geraerdts ............................ 52/371 |
| 1,115,266 | 10/1914 | Wiltse .................................... 52/369 |
| 1,169,066 | 1/1916 | Carrick .................................. 52/371 |
| 1,212,843 | 1/1917 | Struchen .............................. 52/371 |
| 1,555,914 | 10/1925 | Denning ............................ 52/376 X |
| 2,272,762 | 2/1942 | Awbrey ................................. 52/371 |
| 3,159,882 | 12/1964 | Slayter ................................. 52/309.2 |
| 3,353,315 | 11/1967 | Barker ........................... 52/309.11 X |
| 3,363,378 | 1/1968 | Palfey ................................... 52/309.2 |
| 3,415,028 | 12/1968 | Nerem ................................. 52/309.2 |
| 3,472,728 | 10/1969 | Hitch .................................... 52/309.7 |
| 3,626,044 | 12/1971 | Arnaud ................................ 52/309.7 |
| 3,782,049 | 1/1974 | Sachs .................................... 52/309.7 |
| 3,886,706 | 6/1975 | Baker ....................................... 52/615 |
| 3,922,828 | 12/1975 | Patton .................................. 52/309.2 |
| 3,979,867 | 9/1976 | Sowinski ........................... 52/364 X |

FOREIGN PATENT DOCUMENTS

| 640,458 | 3/1964 | Belgium ............................... 52/309.9 |
| 1,069,448 | 2/1954 | France ..................................... 52/722 |
| 2,048,401 | 3/1971 | France ................................. 52/309.7 |
| 1,952,722 | 4/1970 | Fed. Rep. of Germany ............. 52/309 |
| 166,688 | 1/1934 | Switzerland ........................... 52/318 |

*Primary Examiner*—Alfred C. Perham
*Attorney, Agent, or Firm*—Pollock, Vande Sande & Priddy

[57] ABSTRACT

A building panel element comprising a rectangular frame provided on one of its outer surfaces with a wooden plate and on its other outer surface with a plurality of regularly spaced wooden strips, and an insulating rigid foam which completely fills the inside of the frame and the spaces between the strips, the latter being flush with the surface of the foam.

9 Claims, 2 Drawing Figures

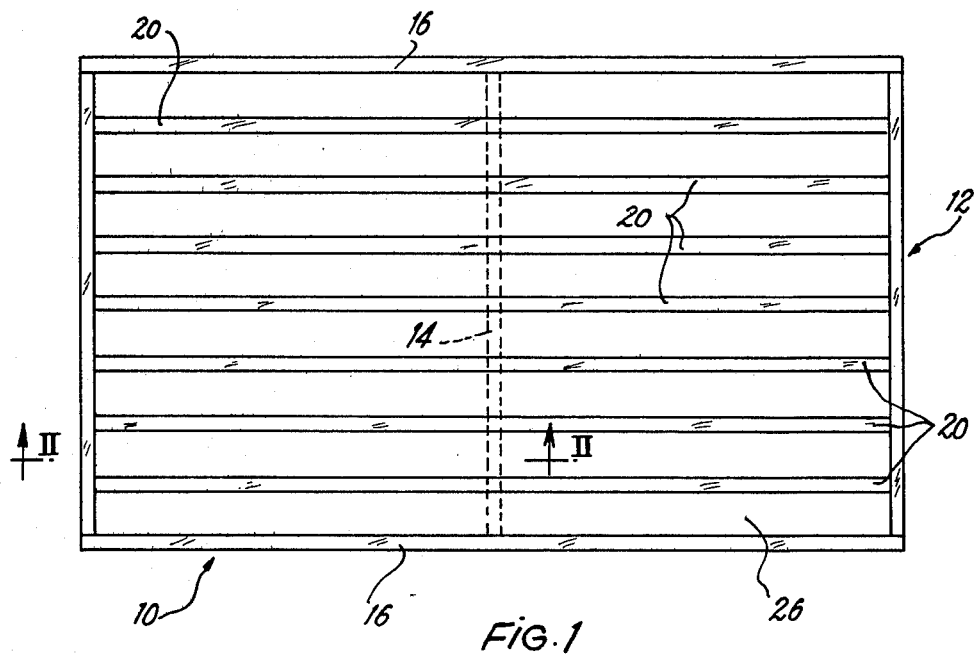
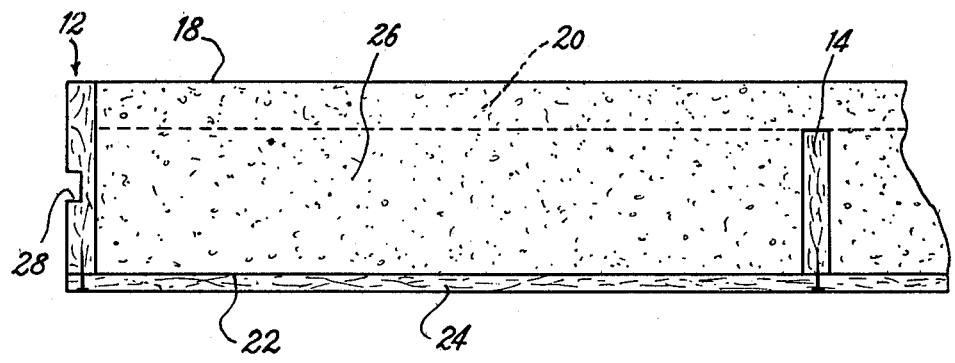

REINFORCED FOAM BUILDING PANEL ELEMENT

BACKGROUND OF THE INVENTION

The present invention relates to insulated building panel element adapted to receive and hold fastening means such as nails, for attachment of modular elements such as ceramic tiles, slates, protective plates, shingles and the like.

French Pat. No. 70 16211, French publication No. 2,048,401 discloses a panel element comprising a plurality of wooden strips secured to a back-up flat element made of wood, and strips of foam covering the back-up element between the wooden strips. Since it is desirable to limit on the one hand the weight of such panel element to a reasonable degree, and on the other hand the quantity of wood necessary for its fabrication, it is necessary in such construction to keep the thickness of the panel element rather small, thereby diminishing its rigidity as well as its stability and insulating properties.

SUMMARY OF THE INVENTION

It is an object of the invention to provide a building panel element which has a good rigidity and is capable of receiving and holding fastening means such as nails while using only a limited quantity of wood in its manufacture.

It is another object of the invention to provide a panel element of relatively light weight offering good thermal insulation and possessing mechanical properties which render the panel suitable for use as a building panel.

The panel element according to the invention comprises a rectangular frame having a front plane surface and a rear plane surface with a thickness between said surfaces, a plate element covering the rear surface, a plurality of rectangular thin members arranged on the front surface in a predetermined spaced relationship, each of said thin members being adapted to receive and hold fastening means such as nails, and a block of insulating foam completely filling the thickness of the frame and the spaces between the thin members.

It is a still further object of the invention to provide a method for manufacturing a panel element in which a block of foam completely fills a wooden frame and incorporates, on one of its plane surfaces, a plurality of rectilinear strips adapted to receive fastening means such as nails.

BRIEF DESCRIPTION OF THE DRAWINGS

FIG. 1 is a front view of a panel element in accordance with the invention, and

FIG. 2 is a sectional view along line II—II of FIG. 1.

DESCRIPTION OF THE PREFERED EMBODIMENT

Referring now to the drawings, reference numeral 10 designates a building panel element essentially but not exclusively adapted to support modular elements such as ceramic tiles, slates, protective plates, shingles, etc, such elements being attached to the panel element by fastening means such as nails, screws, staples, hooks or the like.

Panel 10 comprises a rectangular frame/made of planks of wood or plastic properly assembled to each other at right angles. Frame 12 can be reinforced by one or more intermediate transverse members such as a wooden plank 14 arranged perpendicularly between the opposed longer sides 16 of frame 12.

The front or upper surface 18 of frame 12 is provided with a plurality of thin rectilinear members, such as wooden strips 20, adapted to receive and hold nails or similar fastening means. Strips 20 are arranged in a predetermined spaced relationship parallel to the longer sides 16 of frame 12 so as to be flush with the front face 18 thereof. The or each intermediate transversal member 14 is preferably large enough to engage strips 20. Strips 20 are secured to frame 12 by suitable securing means, such as grooves, nails, glue or the like.

The rear or lower surface 22 of frame 12 is covered by a plate 24 made of ply wood, cardboard, plaster, reinforced plastic sheet or similar material capable of giving the necessary rigidity to frame 12.

The inside of frame 12 i.e, the internal volume defined between the front and rear surfaces 18 and 22, is completely filled with an insulating rigid foam such as polyurethane foam or aphenolic foam. The foam forms a rigid block 26 which adheres to frame 12, plate 24 and strips 20, the latter being incorporated in block 26 and being flush with the front surface 18 thereof. Block 16 can incorporate glass fibers, in the form of fiberglass.

The continuity of foam block 26 in frame 12 give panel 10 good stability as well as excellent thermal insulation. Due to the adherence of foam to strips 20, frame 12 and plate 24, block 26 improves the mechanical characteristics of the panel, since it firmly connects the various wooden parts without substantially increasing the weight of the panel. The quantity of wood necessary for making the panel is reduced to a minimum, since the thickness of strips 20 is limited to what is necessary for holding the fastening means provided for attaching the modular elements (not shown) to the panel. The foam, being not easily combustible, confers this quality to strips 20.

Frame 12 may be provided with longitudinal grooves 28 adapted to facilitate the mounting of the panel to a support element (not shown) or the connection of said panel to another similar panel by means of tongues or similar extruded elements.

So constructed, panel 10 may be used, e.g., as a vertical insulating sidewall or as a partition for use in attic roofs.

A building panel element as described may be constructed as follows: A rectangular frame 12 is built and strips 20 and plate 24 are secured on the front surface 18 and rear surface 22 of the frame 12, respectively. A removable cover (not shown) having an inner plane surface is laid on the front surface 18. Foam is injected thereafter under pressure into the internal volume defined within frame 12, plate 24 and the removable cover, so as to completely fill that volume. Injecting the foam into a closed volume prevents the formation of cavities within the foam block, which cavities may constitute undesired sources of condensation.

A flexible protective sheet, e.g., of asphalt paper, can be a advantageously arranged between the surface 18 and the cover before injecting the foam to facilitate removal of the cover from the foam block. The sheet remains attached to surface 18 of the panel to minimize possible damage to the foam block during handing.

What I claim is:

1. A building panel element comprising
   (a) a rigid block of insulating foam having two opposed major surfaces and thickness between said surfaces;

(b) a peripheral frame enclosing said foam block substantially from one said major surface to the other;

(c) a plurality of spaced rectilinear thin strip members arranged on one side of said peripheral frame and embedded in said foam block substantially flush with one of said major surfaces and spaced from the other of said major surfaces, each of said strip members being adapted to receive and hold fastening means and to assist in rigidifying said foam block, said foam filling the spaces between said strip members;

(d) said insulating foam contributing substantially to the rigidity of said building panel element.

2. A building panel element according to claim 1, further comprising rigidifying means on the other of the said major surfaces of said block of foam.

3. A building panel element according to claim 2, wherein the rigidifying means comprises a plate element.

4. A building panel element according to claim 3, wherein the plate element is made of wood.

5. A building panel element according to claim 1, wherein each thin strip member is a wooden strip.

6. A building panel element according to claim 1, wherein the foam is reinforced with glass fibers.

7. A building panel element according to claim 1, wherein the surface of the block adjacent to the thin strip members is covered with a protective sheet.

8. A building panel element according to claim 1, wherein the thin strip members are parallel.

9. A building panel element according to claim 1, further comprising means for interconnecting the thin strip members.

* * * * *